United States Patent [19]

Hustad

[11] Patent Number: 5,064,664
[45] Date of Patent: Nov. 12, 1991

[54] PACKAGE HAVING ENGRAVED LETTERING PEEL SEAL TAMPER-EVIDENCE MESSAGE

[75] Inventors: Gerald O. Hustad, McFarland; Paul A. Zerfas; Madison, both of Wis.

[73] Assignee: Oscar Mayer Foods Corporation, Madison, Wis.

[21] Appl. No.: 504,518

[22] Filed: Apr. 4, 1990

[51] Int. Cl.$^5$ .......................................... B65D 101/00
[52] U.S. Cl. .................................. 426/87; 426/106; 383/5; 206/459; 206/807
[58] Field of Search ............... 383/5; 426/106, 87; 206/610, 459, 807

[56] References Cited

U.S. PATENT DOCUMENTS

| | | | |
|---|---|---|---|
| 3,625,270 | 12/1971 | Skendzic | 150/3 |
| 3,780,781 | 12/1973 | Uramoto | 150/3 |
| 3,827,472 | 8/1974 | Uramoto | 150/3 |
| 3,923,198 | 12/1975 | Brochman | 220/359 |
| 4,098,577 | 7/1978 | Halpern | 23/232 R |
| 4,448,317 | 5/1984 | Thompson | 215/203 |
| 4,489,841 | 12/1984 | Thompson | 215/203 |
| 4,505,399 | 3/1985 | Weiner | 215/230 |
| 4,526,752 | 7/1985 | Perlman et al. | 422/56 |
| 4,557,505 | 12/1985 | Schaefer et al. | 383/5 |
| 4,589,145 | 5/1986 | Van Erden et al. | 383/5 |
| 4,709,396 | 11/1987 | Voshall et al. | 383/5 |
| 4,709,397 | 11/1987 | Voshall et al. | 383/5 |
| 4,718,553 | 1/1988 | Adamoli et al. | 383/5 |
| 4,749,084 | 6/1988 | Pereyra | 206/459 |
| 4,792,053 | 12/1988 | Towns et al. | 215/250 |
| 4,823,961 | 4/1989 | Griesbach et al. | 426/127 |
| 4,834,552 | 5/1989 | Makowka | 383/5 |
| 4,876,123 | 10/1989 | Rivera et al. | 428/34.2 |
| 4,905,851 | 3/1990 | Thompson | 215/203 |

FOREIGN PATENT DOCUMENTS 1025034 4/1966 United Kingdom ................ 383/5

*Primary Examiner*—Donald E. Czaja
*Assistant Examiner*—A. J. Weier
*Attorney, Agent, or Firm*—Lockwood, Alex, Fitzgibbon & Cummings

[57] ABSTRACT

A package is provided which incorporates a peel seal area or areas that provide readily detectable evidence that the package has been opened or tampered with. Message indicia are provided at or near the peel seal, and the appearance of the message indicia changes when the peel seal area, which has a contact clarity condition when sealed, is broken resulting in the onset of an opacity condition in a background area but not in an indicia area in order to inform a consumer or potential purchaser that the peel seal has been broken. The peel seal area is provided by impressing onto the package a heat seal bar having message indicia engraved thereinto.

16 Claims, 1 Drawing Sheet

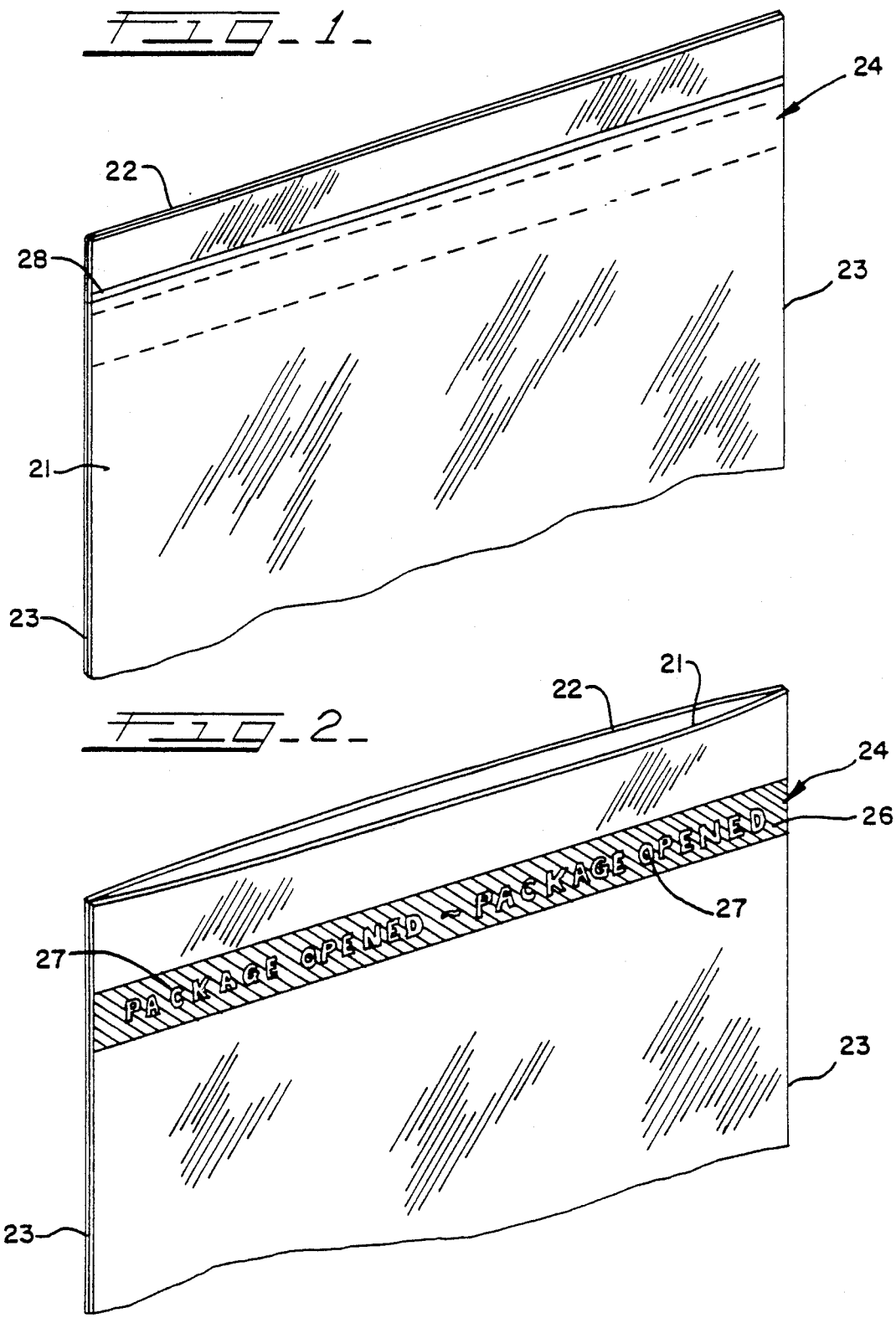

PACKAGE HAVING ENGRAVED LETTERING PEEL SEAL TAMPER-EVIDENCE MESSAGE

BACKGROUND AND DESCRIPTION OF THE INVENTION

The present invention generally relates to packages for hermetically sealing consumable products between generally opposing panels. More particularly, the invention relates to these types of packages which include a peelable seal that secures together at least a portion of the sealing interface between the generally opposing panels. The peel seal incorporates a tamper-evidence feature which conveys a message to the consumer when the peel seal is broken.

Packages having generally opposing panels for hermetically sealing any number of various products are well known. Also well known are packages of this type which incorporate a so-called peel seal. Peel seals can provide a hermetic seal that is suitable for vacuum packaging, for gas-flushed packaging, or other packaging wherein it is important to maintain a closure that will substantially prevent air or gas from entering or leaving the package through the seal, while at the same time provide a seal which can be conveniently opened by the application of digital forces.

Packages of this type provide a convenient and effective means for packaging, distributing and marketing a wide variety of products which would otherwise not exhibit the shelf life that is needed for these products, including those which are intended for human consumption. As exemplified by U.S. Pat. No. 3,647,485, a hermetic breakaway or peelable seal can be formed between an ethylene-polar monomer polymer film or coating and a thermoplastic film. U.S. Pat. No. 3,740,237 describes enclosing a product between a pair of films so as to provide a package having a product enclosing portion and a peripheral flange, and the pair of films are joined to form a hermetic dual seal by applying a continuous strip of peelable bond adhesive through a portion of the film in order to provide the peel seal of that patent. U.S. Pat. No. 4,273,815 describes a laminated film having at least one lamina of polyvinylidene chloride film adhered to at least one lamina of chlorinated polyethylene. Sometimes peel seals are combined with features for providing a reclosable package, such as by incorporating an interlocking strip assembly at a location generally proximate to the peel seal. Examples of patents in this regard include U.S. Pat. No. 4,782,951 and U.S. Pat. No. 4,823,961. The subject matter of all of these patents is incorporated by reference hereinto.

One of the sometimes perceived shortcomings of packages incorporating peel seals is that it is often not readily apparent to the casual observer that the peel seal has been opened. This situation can be further complicated when the package closure arrangement includes members that can be opened and reclosed without ready detection thereof, which is typically the case when reclosable interlocking strips are used. Various approaches have been taken or proposed in order to ensure detection of seal opening or tampering. Exemplary of the various techniques which have been known for providing visual, tamper-evident features on packaging include U.S. Pat. No. 3,780,781, U.S. Pat. No. 4,015,771 and U.S. Pat. No. 4,786,190. A copending application directed to tamper-evident arrangements in flexible packages and the like is U.S. patent application Ser. No. 419,695 of Hustad, filed Oct. 11, 1989.

Developments of this type address the fact that, but for the tamper-evident members provided thereby, a package which has been opened and thereafter reclosed would have an outward appearance comparable to a package which retains its hermetic peel seal, and this opening and reclosing could not be readily detected unless all or a noticeable portion of the contents of the package have been removed. Of course, the likelihood of detection of a package that had been opened and reclosed would be greater for vacuum-packed products because the distinctive product-conforming shape of a vacuum package would be modified in a manner that should be discernible to most knowledgeable consumers. Determining that a package which is not vacuum sealed, such as a gas-flushed package, had been previously opened usually would be more difficult. Many of the tamper-evident means that have been provided or proposed heretofore incorporate a supplementary component such as a tear strip, an extra tab, or the like. Generally, these complicate the package sealing procedure and/or increase the cost of the package.

Accordingly, there is a need for a package of this general type which possesses the convenience of incorporating a peelable seal that is readily opened by the application of digital forces and that provides readily discernible evidence that the peelable seal has been broken, but without the need for adding panels, tabs, tear strips, paper components, tapes and the like. It is important that this need be fulfilled by means which make it readily apparent to the consumer in the store (that is, before the package is purchased by the consumer) that the package had been previously opened or that its peel seal had been otherwise tampered with. This package must be suitable for products intended for human use or consumption, including various food products such as wieners, bacon, sliced luncheon meats, chops, cheese and the like.

In summary, the packages according to the present invention are for hermetically sealing products between generally opposing panels which provide a substantially airtight seal of the product within the package. At least a portion of the seal joining the panels together has peelable properties such that access to the products within the package can be gained by breaking the peelable seal. This peelable seal itself includes tamper evidence means such that breaking of the seal is signaled by a readily discernible modification in the appearance of a message component of the peelable seal area. A background portion of the peelable seal area has a contact clarity condition that is disrupted to an opacity condition in order to create message indicia at the peel seal area, which message indicia inform the purchaser that the peel seal is no longer fully intact. The message indicia are defined by indicia engraved into the heat seal bar which forms the peelable seal.

It is accordingly a general object of the present invention to provide an improved tamper-evident package having a peel seal.

Another object of the present invention is to provide an improved tamper-evident package which incorporates message indicia within the peel seal area in order to directly inform the consumer or prospective purchaser that the peel seal has been opened.

Another object of this invention is to provide a tamper-evident package and method which achieves a tamper-evident objective without requiring added panels, tabs, tear strips and the like.

Another object of the present invention is to provide an improved product package and method that utilizes peel seal means which exhibit a contact clarity condition prior to opening and an out-of-contact opacity condition which creates message indicia that directly indicate the seal has been broken.

Another object of this invention is to provide an improved product package that incorporates a peel seal having tamper-evidence characteristics without incurring any, or only minimal, cost upcharge.

Another object of the present invention is to provide an improved peel seal tamper-evidence characteristic for packages incorporating a procedure using an engraved heat seal bar.

These and other objects, features and advantages of the present invention will be clearly understood through a consideration of the following detailed description.

BRIEF DESCRIPTION OF THE DRAWINGS

In the course of this description, reference will be made to the attached drawings, wherein:

FIG. 1 is a perspective view, partially broken away, of a package according to the present invention prior to opening thereof; and FIG. 2 is a perspective view, partially cut away, of the package shown in FIG. 1 after opening of the tamper-evident peel seal thereof.

DESCRIPTION OF A PARTICULAR EMBODIMENT

The package according to the invention is in-store tamper-evident such that it is apparent to the consumer that the package has been opened or otherwise tampered with upon even a casual examination of the package because the peel seal area itself contains message indicia which undergo a substantial change in legibility or discernibility thereof when the peel seal is opened. This change in legibility or discernibility is caused by including peel seal means which exhibit a contact clarity condition when closed and an out-of-contact opacity condition when opened. This change in appearance will accomplish the appearance of a seal-broken message.

With more particular reference to FIGS. 1 and 2, this is an example of a package for sealing a product (not shown), for example consumable or comestible items including foods and the like, between two sheets of flexible film material. Included is a front panel 21 and a rear panel 22 which are secured together on three sides by non-peelable edge seals 23 and a peel seal area, generally designated as 24. Edge seals 23 may also be peelable.

The peel seal area 24 is formed by impressing the panels with an engraved heat seal bar (not shown) to thereby form a peelable seal which is openable by digital forces between the front panel 21 and the rear panel 22. The panels 21 and 22 exhibit the following general characteristics. The peel seal area 24 has a contact clarity condition to the extent that the peel seal area 24 is substantially transparent so long as the close contact provided by the seal bar is maintained; that is, so long as the peel seal is not opened. When the peel seal area 24 is opened, the areas which were actually sealed by the engraved heat seal bar exhibit an opacity condition whereby the coloration thereof changes, typically by having a cloudy or colored or "whitened" condition imparted thereto. This opacity condition is experienced in those areas where the peel seal had been imparted to the panels by the non-engraved area of the heat seal bar, designated as 26. This opacity condition is not experienced in the engraved indicia areas, designated as 27.

If desired, the contrast provided by the opacity condition can be enhanced by having coloration present on the rear panel 22, at least in the area thereof included within the peel seal area 24. For example, the area of the rear panel 22 between the lines defining the peel seal area 24 shown in FIG. 1 can be of a bright color that may be printed or otherwise provided at the message peel seal area. The front panel 21 as shown in FIG. 1 is transparent or clear in color. Then, when the opacity condition is developed, it covers or at least significantly obscures the portion of the rear panel which is at or beneath the non-engraved or peel sealed background area 26, as is illustrated in FIG. 2. Whatever the color of the rear panel 22 in the area of the peel seal area 24, that color will remain visible at the engraved indicia areas 27, thereby rendering very apparent the message of the indicia areas 27, such as the words "Package Opened" which are shown in FIG. 2.

The peel seal area 24 is formed with a heat seal bar (not shown) having engraved or recessed indicia-shaped surfaces that correspond to the desired pattern or message. Accordingly, the rest of the heat seal bar is raised with respect to the engraved surface and forms heat seal 26 between the front panel 21 and the rear panel 22. According to procedures that are well known, the heat seal bar is made of a material that will transfer heat from the seal bar to the film. The seal bar raised portions, such as those corresponding to peel seal background 26, must be sufficiently well defined and raised above the engraved portions in order to easily transmit heat so as to form the desired clearly readable opacity condition background once the package is opened. Thus, the background area provides a continuous heat seal for the package while the indicia are interspersed therewithin.

The message indicia should convey the fact that the peel seal has been broken. Exemplary wording of the message indicia can include phrases such as "package opened", "safety seal broken", "void", "disrupted seal", "seal opened" and the like. Preferably, the message thus provided will be informative of seal disruption even if only a portion of the seal has been broken. This can be accomplished, for example, by providing a series of repeating indicia across the access opening portion of the package.

In one specific embodiment, the front panel 21 is substantially transparent, while the rear panel 22 is opaque and typically of a decorative color. For example, the rear panel 22 can be a metallized film which has reflective characteristics that are significantly reduced upon the onset of the opacity condition at the peel seal area 24, and the metallized coloration will remain at the indicia areas 27. The package illustrated can be of the vacuum sealed variety, and a stack or a plurality of stacks of sliced luncheon meat or the like are thus packaged therewithin. Other products, including bacon, sausages, cheese and the like are especially suitable for packaging by this arrangement.

Also illustrated is a reclosable sealing assembly 28 of the type that is known in the art, including U.S. Pat. Nos. 4,782,951 and 4,823,961. When it is provided, this reclosable sealing assembly permits the user to easily open and reclose the package after the seal at the peel seal area 24 has been broken.

The package can also take the form of a generally rigid, thermoformed food package, such as the type which is suitable for sliced luncheon meat, cheese and the like, and which includes a cover panel or bubble forming the front or top of the package. A base panel forms the bottom or rear of a package. The cover panel and the base panel enclose a food product therebetween. Typically, the cover panel is substantially transparent, and the base panel is opaque and of an attractive color. The package itself may be vacuum closed or sealed, or it may be gas flushed and sealed with heat and/or pressure. A suitable pressure sensitive or heat sensitive adhesive may be included at the peel seal area which typically also includes the tamper-evident message information. When a contact clarity condition is imparted to the peel seal area by heat and/or pressure induced contact between the cover panel and the base panel, the tamper-evident message information is not apparent. When that contact clarity condition is disrupted by movement of the cover panel and the base panel out of engagement with each other, particularly at the peel seal area, an opacity condition develops which results in development of the background opacity and the appearance of the message information.

Whatever package type is utilized, the best definition and readability of the indicia is realized when the engraved heat bar is applied to the thinner of the two films or panels. This approach also minimizes the dwell time required for successful sealing. For example, best results can be achieved by applying the heat through the non-forming web of a package having a formed web and a non-forming web.

The panels forming the packages according to the present invention can be made from a variety of materials including films, multi-layered laminates or co-extrusions, thermoformable materials and the like. The panels are formulated and/or modified with coatings in order to provide the needed contact clarity condition combined with the onset of an opacity condition when panel contact is broken. When multi-layered films are used, it is typically desirable that the printing or other means for providing coloration or the like is imparted to an innermost portion of the multi-layered panel. For example, for a two-layered panel, the printing or coloration could be present at the interface between the layers of the panel. By this arrangement, the ink or the like will not interfere with the properties of the peel seal and will not cause any concerns for contacting same with a product such as food within the package. It is also possible to utilize coatings such as so-called varnished films in order to provide this type of protection for and/or from the ink or the like. A varnish-like overcoat can also be desirable when the film is of the metalized variety.

Peelable films of the type described herein can be characterized as falling within one of two categories. In one general category, called cohesive seal failure, sealant is contaminated with another material which "weakens" the bond between the panels, and the seal area whitens when opened. The other category is of a delamination or breakaway type wherein the seal bond strength is greater than the laminate strength. The seal bond itself does not whiten, but a thin membrane of film is left behind in the seal area which gives a white opacity appearance when the package is opened. The width of this membrane typically will vary slightly throughout the length of the seal.

Examples of cohesive seal failure types of peelable films include the following combinations. One of the panels is a Surlyn (DuPont trademark) blend with polypropylene and an antiblock agent, which provides a peel seal to a Surlyn 1652 panel to provide a relatively strong peel seal of about 3.5 to about 7.5 pounds/inch. Another combination, which provides a weaker peel seal (between about 1.5 and about 2.5 pounds/inch), seals a Surlyn 1601 panel to a panel of a Surlyn blend with polybutylene. Another panel combination of the cohesive seal failure type which provides good peelability is a polyethylene blend with ethylene vinyl acetate and polybutylene. A Surlyn blend with ethylene vinyl acetate provides peelability between about 1 and about 2.5 pounds/inch. A linear low density polyethylene film system provides microwave approved packaging having seal strengths on the order of about 3 to about 6 pounds/inch. A film of Surlyn 1601 blended with polybutylene seals to straight Surlyn 1601 and also provides microwave approved packaging. Polyethylene film having the desired properties are also available. Another film combination that is of the cohesive seal failure type uses a low density polyethylene film with a film of Surlyn 1601 or 1652 blended with polybutylene or ethylene vinyl acetate.

Exemplary delamination or breakaway systems include Surlyn or polyethylene films (available from Curwood). Cryovac offers a Surlyn three-ply structure blended with ethylene vinyl acetate. Printpack provides a Surlyn or polyethylene system of this type, and Plicon provides a low density polyethylene system of the delamination or breakaway type. An exemplary delamination style of peelable surface is a polyester having a metalized surface on the inside of the panel and a coating of polyvinylidene chloride ("Saran"). A composite structure of polyethylene/ionomer may be used, with the ionomer layer being inside of the web. In this instance, the ionomer is a sealant compatible to the forming web, and the sealant incorporates a delamination style peelable structure. The panel thus formed provides the desired peel seal properties for a package of the type illustrated in FIGS. 10 and 11, with the companion film being a copolyester having a Saran coating and an ionomer that is a composite structure of polyethylene/ionomer, with the ionomer layer being inside of the web.

It will thus be seen that the present invention provides new and useful packaging having tamper-indication means, which packaging has a number of advantages and characteristics, including those pointed out herein and others which are inherent in the invention. Preferred embodiments of the invention have been described by way of example, and it is anticipated that modifications may be made to the described form without departing from the spirit of the invention or the scope of the appended claims.

We claim:

1. In an improved tamper-evident package for hermetically sealing products between generally opposing front and rear panels having a peelable seal securing the generally opposing panels together at a peelable seal area, the peelable seal being openable with digital forces and not reclosable, the improvement comprising:

tamper-evidence means for indicating that the generally opposing panels have been separated at a peelable seal, said tamper-evidence means being substantially within an area defined by the peelable seal;

a background component of said tamper-evidence means within said peelable seal area, said background component being defined as areas where said generally opposing panels are peelably sealed together;

an internal message component of said tamper-evidence means within said peelable seal area, said internal message component having indicia means for informing of seal disruption, said indicia means being unsealed areas bounded by and defined within said background component of the peelable seal, said internal message component being between said generally opposing panels;

said tamper-evidence means has a contact clarity condition such that the internal message component and the background component are substantially the same in appearance, and said peelable seal area including said internal message component, background component and front panel is substantially transparent, when the generally opposing panels are in a sealed state at the peelable seal area;

said background component of the tamper-evidence means has an opacity condition which develops initially upon and persists after disruption of the sealed state of the generally opposing panels at the peelable seal area, which opacity condition does not develop at said internal message component, whereby said internal message component remains substantially transparent, and said opacity condition causes a change in said peelable seal which changes the background component to have an appearance which is no longer substantially transparent and allows detectability of said substantially transparent internal message component of the tamper-evidence means;

said generally opposing panels are flexible films that are sealed together by said peelable seal and by edge seals to form a pouch for hermetically sealing product within the pouch; and said background component and said internal message component of the tamper-evidence means are formed by a heat sealing bar having indicia areas engraved thereinto, which indicia areas are recessed portions that generally correspond to and form said unsealed area indicia means.

2. The tamper-evident package according to claim 1, wherein said message component is substantially indiscernible for so long as said contact clarity condition persists and is rendered readily visible by the onset of said opacity condition.

3. The tamper-evident package according to claim 1, wherein said flexible film opposing panels are heat sealed together.

4. The tamper-evident package according to claim 3, wherein said package vacuum seals a perishable product therewithin.

5. The tamper-evident package according to claim 3, wherein said package is a gas flushed package.

6. The tamper-evident package according to claim 1, wherein at least one of said generally opposing panels is a generally rigid thermoformed film.

7. The tamper-evident package according to claim 1, wherein said generally opposing panels are generally rigid thermoformed films, one of said thermoformed films being a base panel and another of said thermoformed films being a cover panel, whereby a product is peelably sealed between said cover panel and said base panel.

8. The tamper-evident package according to claim 1, wherein the package has two of said panels, wherein one of said generally opposing panels has a contrast coloration section generally under at least said tamper evidence means, and wherein the other of said panels is substantially transparent while said contact clarity condition is maintained.

9. The tamper-evident package according to claim 8, wherein said contrast coloration section is substantially opaque.

10. The tamper-evident package according to claim 1, further including reclosable sealing means for joining said opposing panels at a location generally parallel to said peelable seal.

11. The tamper-evident package according to claim 8, wherein at least one of said panels is multi-layered and wherein said contrast coloration section is between layers of said multi-layered panel.

12. The tamper-evident package according to claim 1, wherein said peelable seal has a peel strength of between about 0.5 and about 7.5 pounds/inch.

13. In an improved tamper-evident package for hermetically sealing perishable products between generally opposing front and rear flexible film panels having a peelable seal securing at least one edge portion of the generally opposing panels together at a peelable seal area and having edge portion seals to form a pouch for sealing a product therewithin, the peelable seal being openable with digital forces and not reclosable, the improvement comprising:

tamper-evidence means for indicating that the generally opposing panels have been separated at a peelable seal, said tamper-evidence means being substantially within an area defined by the peelable seal;

a background component of said tamper-evidence means within said peelable seal area, said background component being defined as areas where said generally opposing panels are peelably sealed together;

a message component of said tamper-evidence means within said peelable seal area, said message component having indicia means for informing of seal disruption, said indicia means being unsealed areas bounded by and defined within said background component of the peelable seal, said internal message component being between said generally opposing panels;

said tamper-evidence means has a contact clarity condition such that the internal message and background components are substantially the same in appearance, and said peelable seal area including said internal message component, background component and front panel is substantially transparent, when the generally opposing panels are in a sealed state at the peelable seal area;

said background component of the tamper-evidence means has an opacity condition which develops initially upon and persists after disruption of sealed state of the generally opposing panels at the peelable seal area, which opacity condition does not develop at said internal message component, whereby said internal message component remains substantially transparent and said opacity condition causes a change in said peelable seal which changes the background component to have an appearance which is no longer substantially transparent and allows ready visibility of said substantially transparent internal message component of the tamper-evidence means;

reclosable sealing means for joining said opposing flexible film panels at a location proximate to said peelable seal; and said background component and said internal message component of the tamper-evidence means are formed by a heat sealing bar having indicia areas engraved thereinto, which indicia areas are recessed portions that generally correspond to and form said indicia means.

14. The tamper-evident package according to claim 13, wherein said message component is substantially indiscernible for so long as said contact clarity condition persists and is rendered readily visible by the onset of said opacity condition.

15. The tamper-evident package according to claim 13, wherein the package has two of said panels, wherein one of said generally opposing panels has a contrast coloration section generally under at least said tamper evidence means, and wherein the other of said panels is substantially transparent while said contact clarity condition is maintained.

16. The tamper-evident package according to claim 15, wherein at least one of said panels is multi-layered and wherein said contrast coloration section is between layers of said multi-layered panel.

* * * * *